United States Patent
Hyde et al.

(10) Patent No.: US 10,360,231 B2
(45) Date of Patent: Jul. 23, 2019

(54) DYNAMICALLY SWITCHING BETWEEN DATA SOURCES

(71) Applicant: Oracle International Corporation, Redwood Shores, CA (US)

(72) Inventors: Justin Hyde, Oakland, CA (US); Jeff Titmas, Berkshire (GB); Gunaranjan Vasireddy, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 256 days.

(21) Appl. No.: 15/157,127

(22) Filed: May 17, 2016

(65) Prior Publication Data

US 2017/0011087 A1     Jan. 12, 2017

Related U.S. Application Data

(60) Provisional application No. 62/188,804, filed on Jul. 6, 2015, provisional application No. 62/262,760, filed on Dec. 3, 2015.

(51) Int. Cl.
G06F 17/30        (2006.01)
G06F 16/25        (2019.01)
G06F 16/21        (2019.01)
G06F 16/23        (2019.01)

(52) U.S. Cl.
CPC .......... *G06F 16/254* (2019.01); *G06F 16/211* (2019.01); *G06F 16/2365* (2019.01)

(58) Field of Classification Search
USPC ....... 707/608, 609, 687, 705, 790, 813, 821, 707/964
See application file for complete search history.

(56) References Cited

U.S. PATENT DOCUMENTS

| | | | |
|---|---|---|---|
| 8,266,186 B2* | 9/2012 | Dettinger | G06Q 10/067 707/601 |
| 2005/0038784 A1 | 2/2005 | Zait et al. | |
| 2005/0234971 A1 | 10/2005 | Folkert et al. | |
| 2010/0161924 A1 | 6/2010 | Sasage | |
| 2013/0151491 A1* | 6/2013 | Gislason | G06F 16/2282 707/696 |
| 2013/0166573 A1* | 6/2013 | Vaitheeswaran | G06F 17/30389 707/749 |
| 2013/0166598 A1* | 6/2013 | Vaitheeswaran | G06F 17/30566 707/792 |
| 2013/0173539 A1* | 7/2013 | Gilder | G06F 16/273 707/622 |
| 2014/0095448 A1 | 4/2014 | Marwah et al. | |
| 2016/0151491 A1* | 6/2016 | Rabinovich | A61K 39/39558 424/93.21 |

OTHER PUBLICATIONS

U.S. Appl. No. 15/156,992, filed May 17, 2016.
(Continued)

*Primary Examiner* — Sana A Al-Hashemi
(74) *Attorney, Agent, or Firm* — Kilpatrick Townsend & Stockton LLP

(57) ABSTRACT

In various embodiments, a data integration system is disclosed which enables dynamically switching between sources for loading data into a data warehouse by utilizing a source-dependent data store at the data warehouse.

20 Claims, 11 Drawing Sheets

(56) References Cited

OTHER PUBLICATIONS

U.S. Appl. No. 15/156,992, "Non Final Office Action", dated May 10, 2018, 20 pages.
U.S. Appl. No. 15/156,992, "Final Office Action", dated Dec. 13, 2018, 21 pages.
U.S. Appl. No. 15/156,992, "Non-Final Office Action", dated May 13, 2019, 28 pages.

* cited by examiner

DYNAMICALLY SWITCHING BETWEEN DATA SOURCES

CROSS-REFERENCE TO RELATED APPLICATIONS

The present application is a non-provisional application of, and claims the benefit and priority under 35 U.S.C. 119(e) of U.S. Provisional Application No. 62/188,804, filed Jul. 6, 2015, entitled "SYSTEMS AND METHODS FOR TECH SWITCHING IN DATA WAREHOUSING," and Provisional Application No. 62/262,760, filed Dec. 3, 2015, entitled "SYSTEM AND METHOD FOR DYNAMIC WAREHOUSE INTERFACE LAYER DEPENDENT ON SOURCE IN A MULTIDIMENSIONAL DATABASE," the entire contents of which are incorporated herein by reference for all purposes. This application is also related to U.S. Non-Provisional application Ser. No. 15/156,992, filed May 17, 2016, entitled "OPTIMIZING INCREMENTAL LOADING OF WAREHOUSE DATA," the entire contents of which is also incorporated herein by reference for all purposes.

BACKGROUND OF THE DISCLOSURE

In today's increasingly fast-paced business environment, organizations need to use more specialized software applications. Additionally, organizations need to ensure the coexistence of these applications on heterogeneous hardware platforms and systems and guarantee the ability to share data between applications and systems.

BRIEF SUMMARY OF THE DISCLOSURE

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

In some examples, a method, implemented by a computing system, a system, and/or a computer-readable medium are provided. The method, system, and/or medium may be configured to identify a plurality of data sources comprising a first data source and a second data source of data to be loaded to a data warehouse, the first data source comprising a business intelligence server and the second data source comprising a local table of the computing system. In some examples, the method, system, and/or medium may receive information about the plurality of data sources and one or more data types of the data associated with the plurality of data sources and/or identify that the data is to be loaded from the second data source. Further, the method, system, and/or medium may also select a transport mechanism from among a plurality of selectable transport mechanisms based at least in part on the second data source and a particular data type of the one or more data types that corresponds to the second data source and/or load the data from the second data source into the data warehouse using the selected transport mechanism.

The method, system, and/or medium may also receive the data from the first data source, store the data as a text file in the second data source, and/or convert data types of the data to the particular data type based at least in part on the identification that the data is to be loaded from the second data source. Additionally, in some cases, selecting the transport mechanism from among a plurality of selectable transport mechanisms based at least in part on the second data source and the one or more data types comprises selecting an object-oriented database connectivity transport mechanism. In some cases, selecting the transport mechanism from among a plurality of selectable transport mechanisms based at least in part on the second data source and the one or more data types comprises selecting a Database link transport mechanism. In some examples, selecting the transport mechanism from among a plurality of selectable transport mechanisms based at least in part on the second data source and the one or more data types comprises selecting a source-dependent data store (SDS) transport mechanism. In some examples, the at least one of the second data source or the data warehouse is managed by the computing system. In some cases, the identification identifies that the data is to be sourced from the second data source, the transport mechanism corresponds to the second data source based at least in part on the identification, and/or a decision to source the data from the second data source is made at deployment time.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed disclosures, any of the presently described embodiments and/or examples, or the presently understood best mode of any innovations presented within this disclosure.

DETAILED DESCRIPTION OF THE DISCLOSURE

Introduction

In various embodiments, a data integration system enables users to create a logical design which is platform and technology independent. The user can create a logical design that defines, at a high level, how a user wants data to flow between sources and targets. The tool can analyze the logical design, in view of the user's infrastructure, and create a physical design. The logical design can include a plurality of components corresponding to each source and target in the design, as well as operations such as joins or filters. Each component when transferred to the physical design generates code to perform operations on the data. Depending on the underlying technology (e.g., SQL Server, Oracle, Hadoop, etc.) and the language used (SQL, pig, etc.) the code generated by each component may be different.

In one aspect, a user of the data integration system is not required to specify all data attributes at each component in the logical design, from start to end. The data integration system provides a plurality of component types, such as projector and selector types, that avoid the need to fully declare the information that flows through the logical design. The data integration system is able to decide what attributes are needed at operations represented by predetermined component types. This simplifies both the design and the maintenance.

Figure 1:
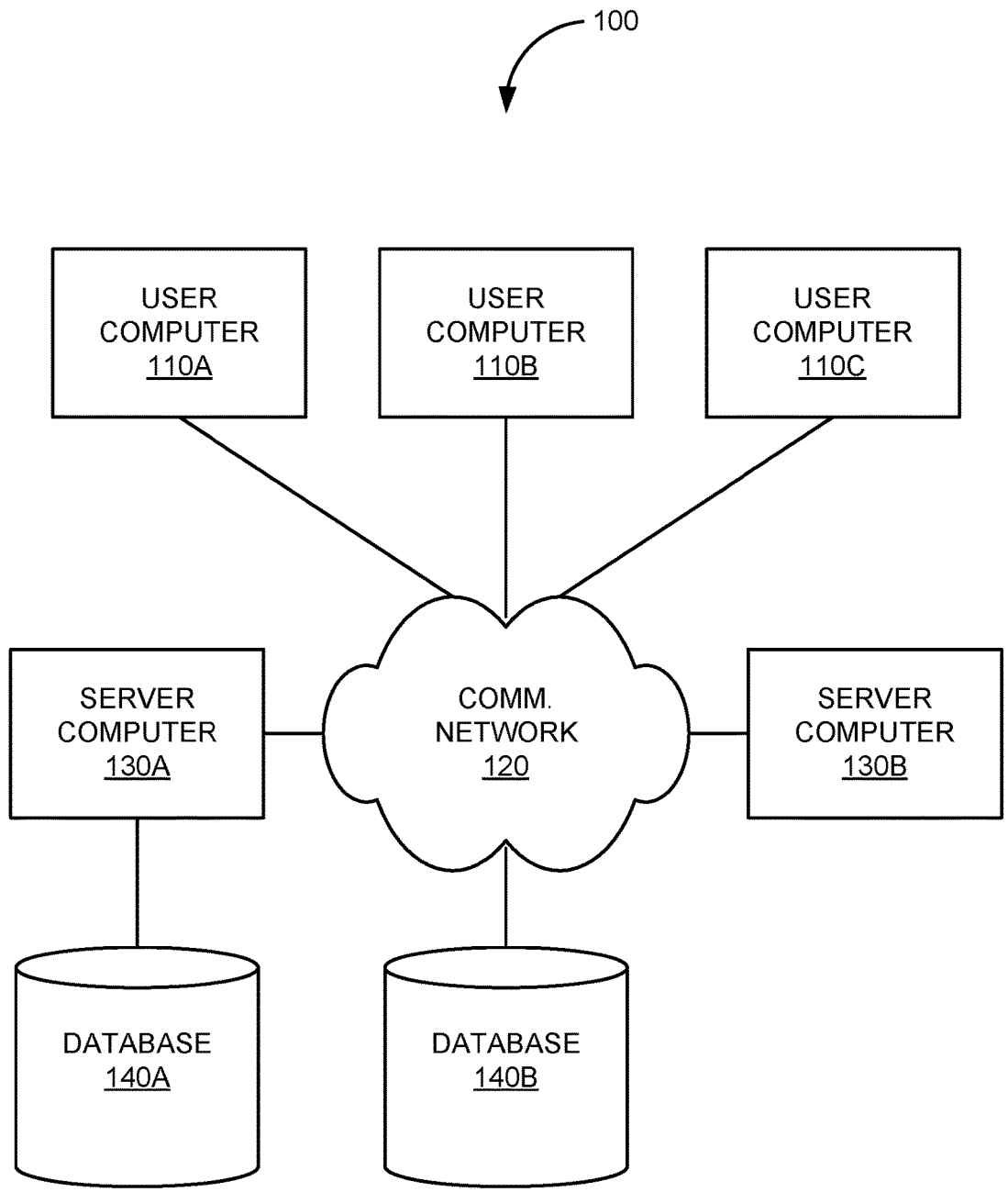
FIG. 1 is a simplified illustration of a system that may incorporate an embodiment of the present disclosure.

FIG. 1 is a simplified illustration of system 100 that may incorporate an embodiment or be incorporated into an embodiment of any of the innovations, embodiments, and/or examples found within this disclosure. System 100 is merely illustrative of an embodiment incorporating the present disclosure and does not limit the scope of the disclosure as recited in the claims. One of ordinary skill in the art would recognize other variations, modifications, and alternatives.

In one embodiment, system 100 includes one or more user computers 110 (e.g., computers 110A, 110B, and 110C). User computers 110 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 110 can also have any of a variety of applications, including one or more applications configured to perform methods of the disclosure, as well as one or more office applications, database client and/or server applications, and web browser applications.

Alternatively, user computers 110 can be any other electronic device, such as a thin-client computer, Internet-enabled mobile telephone, and/or personal digital assistant, capable of communicating via a network (e.g., communications network 120 described below) and/or displaying and navigating web pages or other types of electronic documents. Although the system 100 is shown with three user computers, any number of user computers or devices can be supported.

Certain embodiments of the disclosure operate in a networked environment, which can include communications network 120. Communications network 120 can be any type of network familiar to those skilled in the art that can support data communications using any of a variety of commercially-available protocols, including without limitation TCP/IP, SNA, IPX, AppleTalk, and the like. Merely by way of example, communications network 120 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the disclosure can include one or more server computers 130 (e.g., computers 130A and 130B). Each of server computers 130 may be configured with an operating system including without limitation any of those discussed above, as well as any commercially-available server operating systems. Each of server computers 130 may also be running one or more applications, which can be configured to provide services to one or more clients (e.g., user computers 110) and/or other servers (e.g., server computers 130).

Merely by way of example, one of server computers 130 may be a web server, which can be used, merely by way of example, to process requests for web pages or other electronic documents from user computers 110. The web server can also run a variety of server applications, including HTTP servers, FTP servers, CGI servers, database servers, Java servers, and the like. In some embodiments of the disclosure, the web server may be configured to serve web pages that can be operated within a web browser on one or more of user computers 110 to perform methods of the disclosure.

Server computers 130, in some embodiments, might include one or more file and/or application servers, which can include one or more applications accessible by a client running on one or more of user computers 110 and/or other server computers 130. Merely by way of example, one or more of server computers 130 can be one or more general purpose computers capable of executing programs or scripts in response to user computers 110 and/or other server computers 130, including without limitation web applications (which might, in some cases, be configured to perform methods of the disclosure).

Merely by way of example, a web application can be implemented as one or more scripts or programs written in any programming language, such as Java, C, or C++, and/or any scripting language, such as Perl, Python, or TCL, as well as combinations of any programming/scripting languages. The application server(s) can also include database servers, including without limitation those commercially available from Oracle, Microsoft, IBM and the like, which can process requests from database clients running on one of user computers 110 and/or another of server computers 130.

In some embodiments, an application server can create web pages dynamically for displaying the information in accordance with embodiments of the disclosure. Data provided by an application server may be formatted as web pages (comprising HTML, XML, Javascript, AJAX, etc., for example) and/or may be forwarded to one of user computers 110 via a web server (as described above, for example). Similarly, a web server might receive web page requests and/or input data from one of user computers 110 and/or forward the web page requests and/or input data to an application server.

In accordance with further embodiments, one or more of server computers 130 can function as a file server and/or can include one or more of the files necessary to implement methods of the disclosure incorporated by an application running on one of user computers 110 and/or another of server computers 130. Alternatively, as those skilled in the art will appreciate, a file server can include all necessary files, allowing such an application to be invoked remotely by one or more of user computers 110 and/or server computers 130. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 140 (e.g., databases 140A and 140B). The location of the database(s) 140 is discretionary: merely by way of example, database 140A might reside on a storage medium local to (and/or resident in) server computer 130A (and/or one or more of user computers 110). Alternatively, database 140B can be remote from any or all of user computers 110 and server computers 130, so long as it can be in communication (e.g., via communications network 120) with one or more of these. In a particular set of embodiments, databases 140 can reside in a storage-area network ("SAN") familiar to those skilled in the art. (Likewise, any necessary files for performing the functions attributed to user computers 110 and server computers 130 can be stored locally on the respective computer and/or remotely, as appropriate). In one set of embodiments, one or more of databases 140 can be a relational database that is adapted to store, update, and retrieve data in response to SQL-formatted commands. Databases 140 might be controlled and/or maintained by a database server, as described above, for example.

Data Integration Overview

Figure 2:
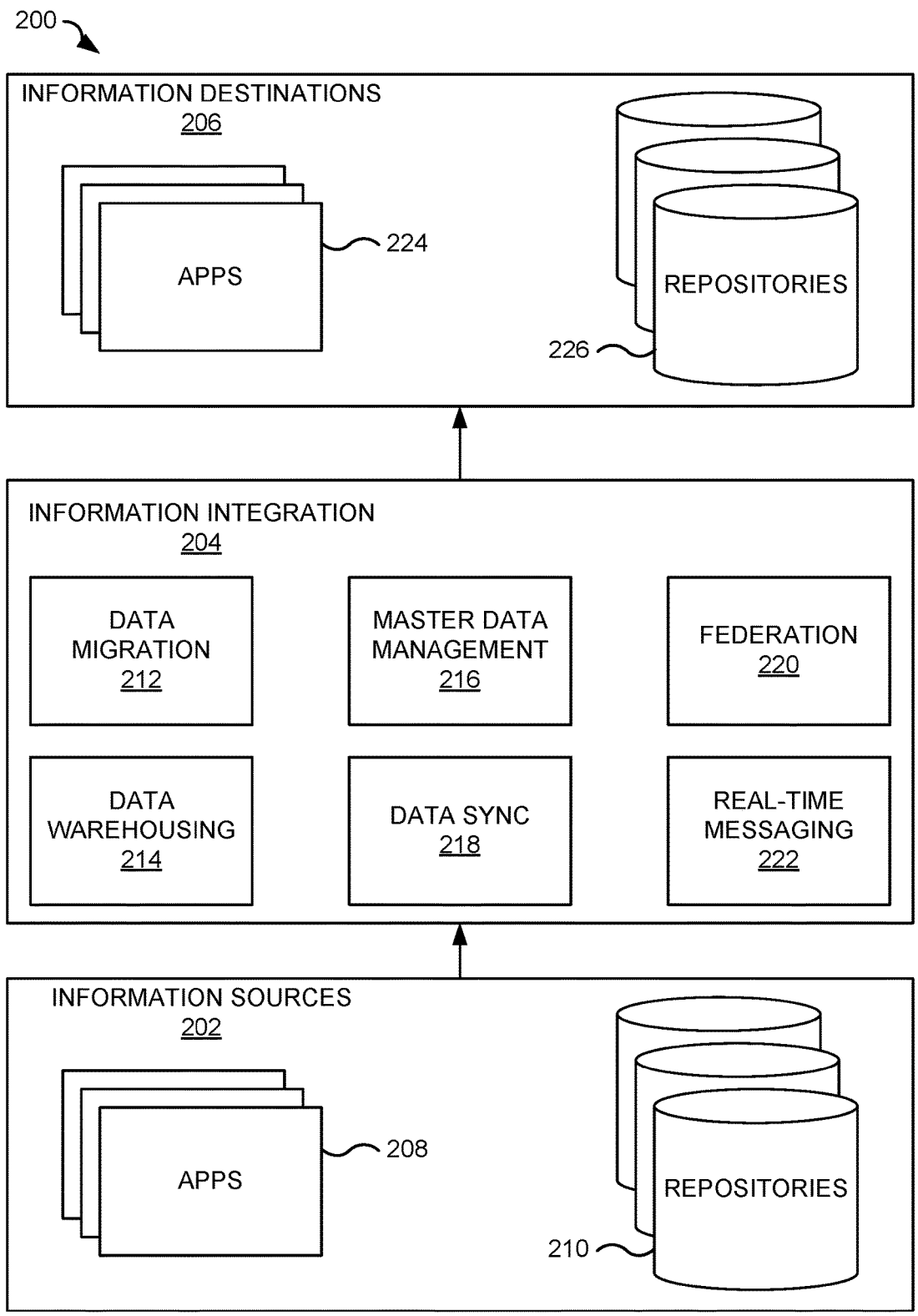
FIG. 2 is a block diagram of a data integration system according to an embodiment of the present disclosure.

FIG. 2 is a simplified block diagram of data integration system 200 according to an embodiment of the present disclosure. FIG. 2 is a simplified illustration of data integration system 200 that may incorporate various embodiments or implementations of the one or more disclosures presented within this disclosure. FIG. 2 is merely illustrative of an embodiment or implementation of the present disclosure, and should not limit the scope of any disclosure as recited in the claims. One of ordinary skill in the art may recognize through this disclosure and the teachings presented herein other variations, modifications, and/or alternatives to those embodiments or implementations illustrated in the figures.

In this embodiment, data integration system 200 includes information sources 202, information integration 204, and information destinations 206. In general, information flows from information sources 202 to information integration 204 whereby the information may be consumed, made available, or otherwise used by information destinations 206. Data flows may be unidirectional or bidirectional. In some embodiments, one or more data flows may be present in data integration system 200.

Information sources 202 are representative of one or more hardware and/or software elements configured to source data. Information sources 202 may provide direct or indirect access to the data. In this embodiment, information sources 202 include one or more applications 208 and one or more repositories 210.

Applications 208 are representative of traditional applications, such as desktop, hosted, web-based, or cloud-based applications. Applications 208 may be configured to receive, process, and maintain data for one or more predetermined purposes. Some examples of applications 208 include customer relationship management (CRM) applications, financial services applications, government and risk compliance applications, human capital management (HCM), procurement applications, supply chain management applications, project or portfolio management applications, or the like. Applications 208 may include functionality configured for manipulating and exporting application data in a variety of human-readable and machine-readable formats, as is known in the art. Applications 208 may further access and store data in repositories 210.

Repositories 210 are representative of hardware and/or software elements configured to provide access to data. Repositories 210 may provide logical and/or physical partitioning of data. Repositories 210 may further provide for reporting and data analysis. Some examples of repositories 210 include databases, data warehouses, cloud storage, or the like. A repository may include a central repository created by integrating data from one or more applications 208. Data stored in repositories 210 may be uploaded from an operational system. The data may pass through additional operations before being made available in a source.

Information integration 204 is representative of one or more hardware and/or software elements configured to provide data integration services. Direct or indirect data integration services can be provided in information integration 204. In this embodiment, information integration 204 includes data migration 212, data warehousing 214, master data management 216, data synchronization 218, federation 220, and real-time messaging 222. It will be understood that information integration 204 can include one or more modules, services, or other additional elements than those shown in here that provide data integration functionality.

Data migration 212 is representative of one or more hardware and/or software elements configured to provide data migration. In general, data migration 212 provides one or more processes for transferring data between storage types, formats, or systems. Data migration 212 usually provides for manual or programmatic options to achieve a migration. In a data migration procedure, data on or provided by one system is mapped to another system providing a design for data extraction and data loading. A data migration may involve one or more phases, such a design phase where one or more designs are created that relate data formats of a first system to formats and requirements of a second system, a data extraction phase where data is read from the first system, a data cleansing phase, and a data loading phase where data is written to the second system. In some embodiments, a data migration may include a data verification phases to determine whether data is accurately processed in any of the above phases.

Data warehousing 214 is representative of one or more hardware and/or software elements configured to provide databases used for reporting and data analysis. A data warehouse is typically viewed as a central repository of data which is created by integrating data from one or more disparate sources. Data warehousing 214 may include the current storage of data as well as storage of historical data. Data warehousing 214 may include typical extract, transform, load (ETL)-based data warehouse whereby staging, data integration, and access layers house key functions. In one example, a staging layer or staging database stores raw data extracted from each of one or more disparate source data systems. An integration layer integrates disparate data sets by transforming the data from the staging layer often storing this transformed data in an operational data store (ODS) database. The integrated data is then moved to yet another database, often called the data warehouse database. The data can be arranged into hierarchical groups (often called dimensions) and into facts and aggregate facts. An access layer may be provided to help users or other systems retrieve data. Data warehouses can be subdivided into data marts whereby each data mart stores subsets of data from a warehouse. In some embodiments, data warehousing 214 may include business intelligence tools, tools to extract, transform and load data into the repository, and tools to manage and retrieve metadata.

Master data management 216 is representative of one or more hardware and/or software elements configured to manage a master copy of data. Master data management 216 may include a set of processes, governance, policies, standards and tools that consistently define and manage master data. Master data management 216 may include functionality for removing duplicates, standardizing data, and incorporating rules to eliminate incorrect data from entering a system in order to create an authoritative source of master data. Master data management 216 may provide processes for collecting, aggregating, matching, consolidating, quality-assuring, persisting and distributing data throughout an organization to ensure consistency and control in the ongoing maintenance and application use of information.

Data synchronization 218 is representative of one or more hardware and/or software elements configured to synchronize data. Data synchronization 218 may provide for establishing consistency among data from a source to a target and vice versa. Data synchronization 218 may further provide for the continuous harmonization of the data over time.

Federation 220 is representative of one or more hardware and/or software elements configured to consolidate a view of data from constituent sources. Federation 220 may transparently map multiple autonomous database systems into a single federated database. The constituent databases maybe interconnected via a computer network and may be geographically decentralized. Federation 220 provides an alternative to merging several disparate databases. A federated database, or virtual database, for example, may provide a composite of all constituent databases. Federation 220 may not provide actual data integration in the constituent disparate databases but only in the view.

Federation 220 may include functionality that provides a uniform user interface, enabling users and clients to store and retrieve data in multiple noncontiguous databases with a single query—even if the constituent databases are heterogeneous. Federation 220 may include functionality to decompose a query into subqueries for submission to relevant constituent data sources and composite the result sets of the subqueries. Federation 220 can include one or more wrappers to the subqueries to translate them into appropriate query languages. In some embodiments, federation 220 is a collection of autonomous components that make their data available to other members of the federation through the publication of an export schema and access operations.

Real-time messaging 222 is representative of one or more hardware and/or software elements configured to provide messaging services subject to a real-time constraint (e.g., operational deadlines from event to system response). Real-time messaging 222 may include functionality that guarantees an action or response within strict time constraints. In one example, real-time messaging 222 may be tasked with taking some orders and customer data from one database, combining it with some employee data held in a file, and then loading the integrated data into a Microsoft SQL Server 2000 database. Because orders need to be analyzed as they arrive, real-time messaging 222 may pass the orders through to a target database in as close to real time as possible and extract only the new and changed data to keep the workload as small as possible.

Information destinations 206 are representative of one or more hardware and/or software elements configured to store or consume data. In this embodiment, information destinations 206 may provide direct or indirect access to the data. In this embodiment, information destinations 206 include one or more applications 224 and one or more repositories 226.

Applications 224 are representative of traditional applications, such as desktop, hosted, web-based, or cloud-based applications. Applications 224 may be configured to receive, process, and maintain data for one or more predetermined purposes. Some examples of applications 224 include customer relationship management (CRM) applications, financial services applications, government and risk compliance applications, human capital management (HCM), procurement applications, supply chain management applications, project or portfolio management applications, or the like. Applications 224 may include functionality configured for manipulating and importing application data in a variety of human-readable and machine-readable formats, as is known in the art. Applications 224 may further access and store data in repositories 226.

Repositories 226 are representative of hardware and/or software elements configured to provide access to data. Repositories 226 may provide logical and/or physical partitioning of data. Repositories 226 may further provide for reporting and data analysis. Some examples of repositories 226 include databases, data warehouses, cloud storage, or the like. A repository may include a central repository created by integrating data from one or more applications 226. Data stored in repositories 226 may be uploaded or imported through information integration 204. The data may pass through additional operations before being made available at a destination.

Data Integration System

Figure 3:
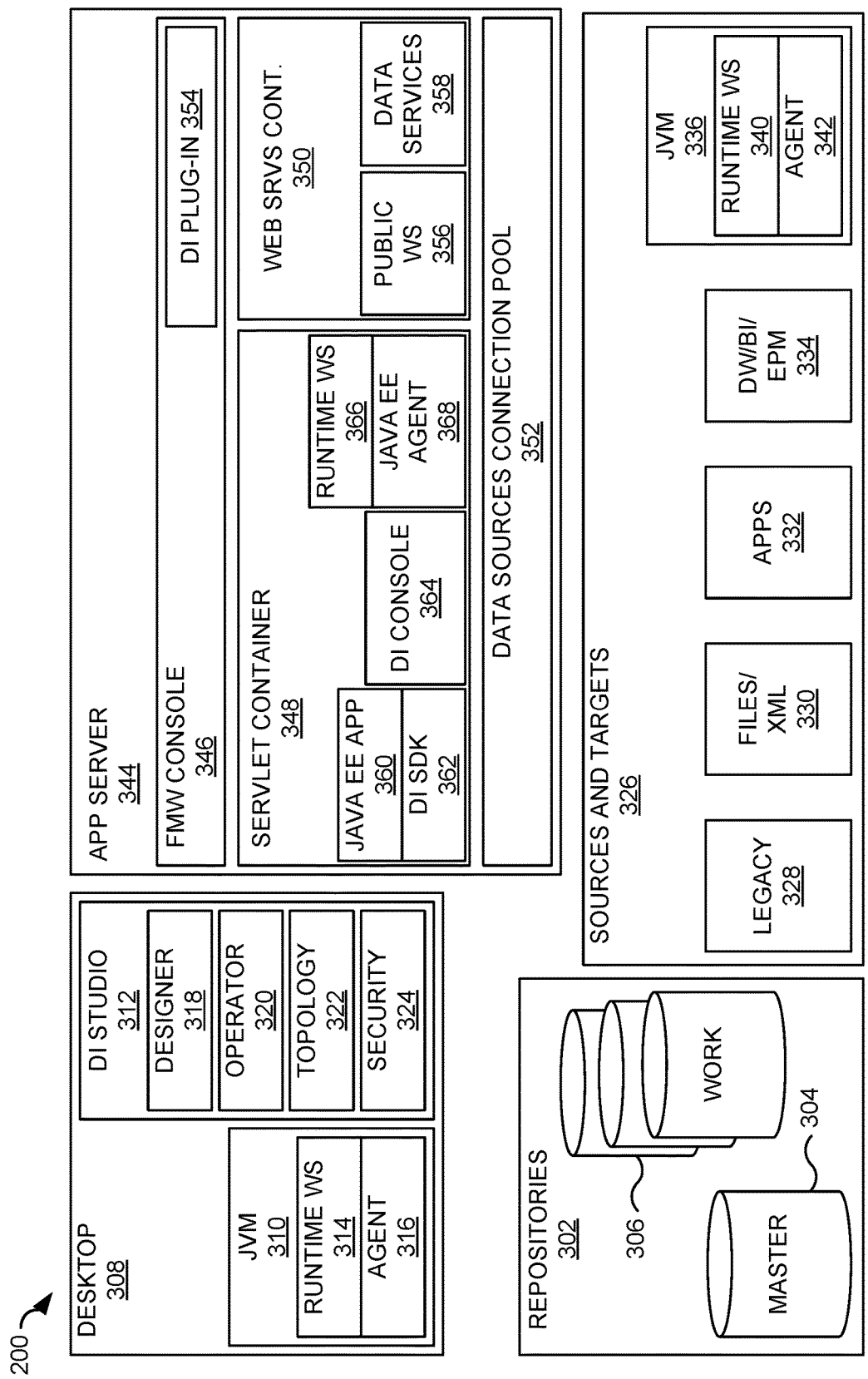
FIG. 3 is a simplified block diagram of a hardware/software stack that may be used to implement a data integration system according to an embodiment of the present disclosure.

FIG. 3 is a simplified block diagram of a hardware/software stack that may be used to implement data integration system 200 according to an embodiment of the present disclosure. FIG. 3 is merely illustrative of an embodiment or implementation of the disclosure, and should not limit the scope of any disclosure as recited in the claims. One of ordinary skill in the art may recognize through this disclosure and the teachings presented herein other variations, modifications, and/or alternatives to those embodiments or implementations illustrated in the figures. One example of components found within data integration system 200 according to this embodiment may include ORACLE DATA INTEGRATOR, a member of the ORACLE FUSION Middleware family of products provided by Oracle of Redwood Shores, Calif. or any other Data Integrator (DI). ORACLE DATA INTEGRATOR is a Java-based application that uses one or more databases to perform set-based data integration tasks. In addition, DIs can extract data, provide transformed data through Web services and messages, and create integration processes that respond to and create events in service-oriented architectures.

In various embodiments, data integration system 200 provides a new declarative design approach to defining data transformation and integration processes, resulting in faster and simpler development and maintenance. Data integration system 200 thus separates declarative rules from the implementation details. Data integration system 200 further provides a unique E—LT architecture (Extract—Load Transform) for the execution of data transformation and validation processes. This architecture in embodiments eliminates the need for a standalone ETL server and proprietary engine. In some embodiments, data integration system 200 instead leverages the inherent power of RDBMS engines.

In some embodiments, data integration system 200 integrates in one or more middleware software packages, such as the ORACLE FUSION MIDDLEWARE platform and becomes a component of the middleware stack. As depicted in FIG. 3 data integration system 200 may provide run-time components as Java EE applications.

In this example, one component of data integration system 200 is repositories 302. Repositories 302 are representative of hardware and/or software elements configured to store configuration information about an IT infrastructure, metadata of all applications, projects, scenarios, and execution logs. In some aspects, multiple instances of repositories 302 can coexist in an IT infrastructure, for example Development, QA, User, Acceptance, and Production. Repositories 302 are configured to allow several separated environments that exchange metadata and scenarios (for example: Development, Test, Maintenance and Production environments). Repositories 302 further are configured to act as a version control system where objects are archived and assigned a version number.

In this example, repositories 302 are composed of at least one master repository 304 and one or more work repositories 306. Objects developed or configured for use within data integration system 200 may be stored in one of these repository types. In general, master repository 304 stores the following information: security information including users, profiles and rights, topology information including technologies, server definitions, schemas, contexts, languages and so forth, and versioned and archived objects. The one or more work repositories 306 may contain actual developed objects.

Several work repositories may coexist in data integration system 200 (for example, to have separate environments or to match a particular versioning life cycle). The one or more work repositories 306 store information for models, including schema definition, data stores structures and metadata, fields and columns definitions, data quality constraints, cross references, data lineage, and so forth. The one or more work repositories 306 may further store projects, including business rules, packages, procedures, folders, knowledge modules, variables and so forth, and scenario execution, including scenarios, scheduling information and logs. In some aspects, the one or more work repositories 306 may contain only execution information (typically for production purposes), and be designated as an execution repository.

In various embodiments, repositories 302 store one or more ETL projects. An ETL project defines or otherwise specifies one or more data models that model data attributes of data in a source or target. An ETL project further provides for data quality control as well as defining mappings to move and transform data. Data integrity control ensures the overall consistency of the data. Application data is not always valid for the constraints and declarative rules imposed by a particular source or target. For example, orders may be found with no customer, or order lines with no product, and so forth. Data integration system 200 provides a working environment to detect these constraint violations and to store them for recycling or reporting purposes.

In some embodiments of data integration system 200, there are two different types of controls: Static Control and Flow Control. Static Control implies the existence of rules that are used to verify the integrity of application data. Some of these rules (referred to as constraints) may already be implemented in data servers (using primary keys, reference constraints, etc.) Data integration system 200 allows for the definition and checking of additional constraints, without declaring them directly in a source. Flow Control relates to targets of transformation and integration processes that implement their own declarative rules. Flow Control verifies an application's incoming data according to these constraints before loading the data into a target. Flow control procedures are general referred to as mappings.

An ETL project can be automated into a package that can be deployed for execution in a runtime environment. Accordingly, the automation of data integration flows is achieved by sequencing the execution of the different steps (mappings, procedures, and so forth) in a package and by producing a production scenario containing ready-to-use code for each of these steps. A package is typically made up of a sequence of steps organized into an execution diagram. Packages are the main objects used to generate scenarios for production. They represent the data integration workflow and can perform jobs, such as for example: start a reverse-engineering process on a datastore or a model, send an email to an administrator, download a file and unzip it, define the order in which mappings must be executed, and define loops to iterate over execution commands with changing parameters.

A scenario is designed to put a source component (mapping, package, procedure, variable) into production. A scenario results from the generation of code (SQL, shell, and so forth) for this component. Once generated, the code of the source component is frozen and the scenario is stored inside repositories 302, such as one or more of work repositories 306. A scenario can be exported and then imported into different production environments.

In various embodiments, data integration system 200 is organized around repositories 302 in a modular fashion accessed by Java graphical modules and scheduling agents. Graphical modules can be used to design and build one or more integration processes stored in repositories 302. Administrators, Developers and Operators may use a development studio to access repositories 302. Agents can be used to schedule and coordinate a set of integration tasks associated with an integration process stored in work repositories 306. For example, at runtime, an agent deployed on a desktop, web services, or otherwise in communication with a source coordinates the execution of one or more integration processes. The agent may retrieve code stored in work repository 306, connect to various source and target systems using connection information stored in a master repository 304, and orchestrate an overall data integration process or scenario.

In this embodiment, data integration system 200 includes desktop 308 that may include one or more of the above discussed graphical modules and/or agents. Desktop 308 is representative of one or more desktop or workstation computing devices, such as personal computers, laptops, netbooks, tablets, and the like. Desktop 308 includes a Java virtual machine (JVM) 310 and Data Integrator (DI) Studio 312. Java virtual machine (JVM) 310 is a virtual machine that can execute Java bytecode. JVM 310 is most often implemented to run on an existing operating system, but can also be implemented to run directly on hardware. JVM 310 provides a run-time environment in which Java bytecode can be executed, enabling features such as runtime web service (WS) 314 and agent 316. JVM 310 may include a Java Class Library, a set of standard class libraries (in Java bytecode) that implement the Java application programming interface (API), and other elements that form a Java Runtime Environment (JRE).

Agent 316 is configured to schedule and coordinate a set of integration tasks associated with one or more integration processes stored in work repositories 306. For example, at runtime, an agent coordinates the execution of integration processes. The agent may retrieve code stored in master repository 304, connect to various source and target systems, and orchestrate an overall data integration process or scenario.

Referring again to FIG. 3, DI 312 includes hardware and/or software elements configured to design data integration projects. In this example, DI 312 includes four graphical modules or navigators that are used to create and manage data integration projects, namely, designer module 318, operator module 320, topology module 322, and security module 324. Designer module 318 is a module configured to define data stores (tables, files, Web services, and so on), data mappings, and packages (sets of integration steps, including mappings). In various embodiments, designer module 318 defines declarative rules for data transformation and data integrity. Accordingly, project development takes place in designer module 318. Additionally, in designer module 318, is where database and application metadata are imported and defined. Designer module 318, in one embodiment, uses metadata and rules to generate data integration scenarios or load plans for production. In general, designer module 318 is used to design data integrity checks and to build transformations such as for example: automatic reverse-engineering of existing applications or databases, graphical development and maintenance of transformation and integration mappings, visualization of data flows in the mappings, automatic documentation generation, and customization of generated code.

Operator module 320 is a module configured to view and manage production integration jobs. Operator module 320, thus, manages and monitors data integration processes in production and may show execution logs with error counts, the number of rows processed, execution statistics, the actual code that is executed, and so on. At design time, developers can also use operator module 320 for debugging purposes in connection with designer module 318.

Topology module 322 is a module configured to create and manage connections to datasources and agents. Topology module 322 defines the physical and logical architecture of the infrastructure. Infrastructure or projects administrators may register servers, database schemas and catalogs, and agents in a master repository through topology module 322. Security module 324 is a module configured to manage users and their repository privileges.

In general, a user or process interacts with designer module 318 to create a data integration project having one or more data integration processes for sources and targets 326. Each data integration process includes at least one data integration task. In some embodiments, a data integration tasks is defined by a set of business rules indicative of what bit of data is to be transformed and combined with other bits as well as technical specifics of how the data is actually extracted, loaded, and so on. In some embodiments, a data integration tasks is specified using a declarative approach to build data mappings. A mapping is an object that populates one datastore, called the target, which data coming from one or more other datastores, known as sources. In general, columns in the source datastore are linked to the columns in the target datastore through mapping. A mapping can be added into a package as a package step. As discussed above, a package defines a data integration job. A package is created under a project and is made up of an organized sequence of steps, each of which can be a mapping or a procedure. A package can have one entry point and multiple exit points.

In some embodiments, when creating a new mapping, a developer or technical business user interacts with designer 318 to first define which data is integrated and which business rules should be used. For example, the developer may specify what tables are to be joined, filters to be applied, and SQL expressions to be used to transform data. The particular dialect of SQL that is used is determined by the database platform on which the code is to be executed. Then, in a separate step, technical staff can interact with designer 318 to choose the most efficient way to extract, combine, and then integrate this data. For example, the technical staff may use database-specific tools and design techniques such as incremental loads, bulk-loading utilities, slowly changing dimensions, and changed-data capture.

In this embodiment, mappings can be created for sources and targets 326. Sources and targets 326 may include one or more legacy applications 328, one or more files/XML documents 330, one or more applications 332, one or more data warehouses (DW), business intelligence (BI) tools and applications, and enterprise process management (EPM) tools and applications 334, and one or more JVMs 336 (including runtime web service 340 and agent 342).

Figure 4:
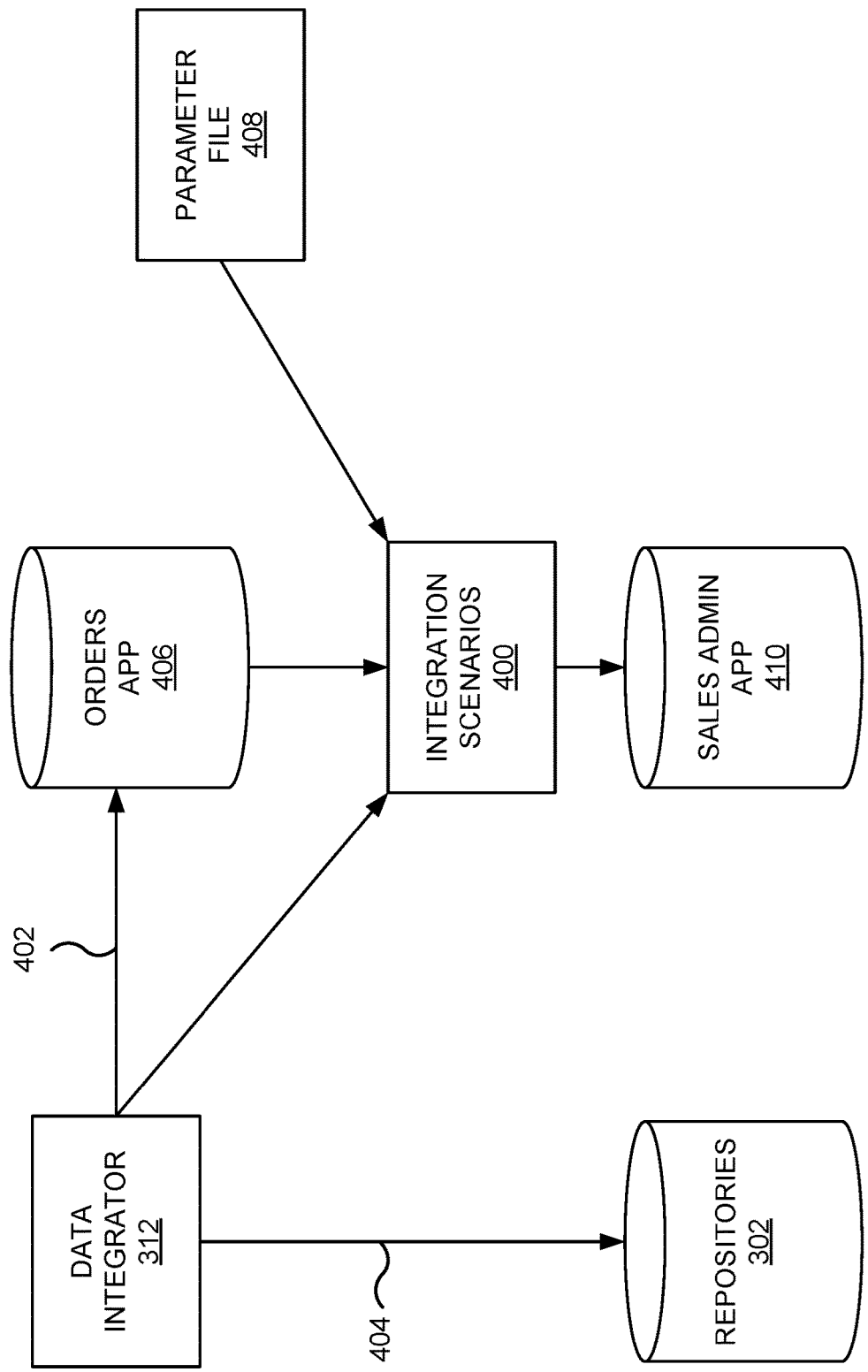
FIG. 4 is a block diagram of an environment having various heterogeneous data sources for which data integration scenarios may be created in various embodiments of the present disclosure.

FIG. 4 is a block diagram of environment 400 having various heterogeneous data sources for which data integration scenarios may be created in various embodiments of the present disclosure. In this example, environment 400 includes DI 312 and repositories 302. Repositories 302 contain all of the metadata required to generate integration scenarios 400. A user or process interacts with DI 312 to create integration scenarios 400 using data integrity controls 402 and declarative rules 404.

Orders application 406 is representative of an application for tracking customer orders. An "Orders Application" data model is created to represent data stored in Orders application 406 as well as any data integrity controls or conditions. For example, the "Orders Application" data model may be based on a Hyper Structured Query Language (HSQL) interface and include five datastores, SRC_CITY, SRC_CUSTOMER, SRC_ORDERS, SRC_ORDER_LINES, SRC_PRODUCT, and SRC_REGION.

Parameter file 408 is representative of a flat file (e.g., ASCII) issued from a production system containing a list of sales representatives and the segmentation of ages into age ranges. In this example, a "Parameter" data model is created to represent the data in the flat file. For example, the "Parameter" data model may be based on a file data server and include two datastores, SRC_SALES_PERSON and SRC_AGE_GROUP.

Sales administration application 410 is representative of an application for tracking sales. The sales administration application 410 may be a data warehouse populated with transformations of data from orders application 406 and parameter file 408. A "Sales Administration" data model is created to represent data stored in sales administration application 410 as well as any data integrity controls or conditions or transformations. For example, the "Sales Administration" data model may be based on a Hyper Structured Query Language (HSQL) data server and include six datastores, TRG_CITY, TRG_COUNTRY, TRG_CUSTOMER, TRG_PRODUCT, TRG_PROD_FAMILY, TRG_REGION, and TRG_SALE.

Referring again to FIG. 3, agents can be used to schedule and coordinate a set of integration tasks associated with an integration process. For example, at runtime, an agent coordinates the execution of integration processes. The agent may retrieve code stored in a work repository 306, connect to the various source and target systems and orchestrate an overall data integration process or scenario. In various embodiments, there are two types of agents. In one example, a standalone agent is installed on desktop 308, such as agent 316. In another example, an application server agent can be deployed on application server 326 (such as a Java EE Agent deployed on a WebLogic Server) and can benefit from the application server layer features such as clustering for High Availability requirements. In yet another example, an agent can be deployed on sources and targets 326, such as agent 342.

In this embodiment, data integration system 200 includes application server 344 that may include one or more of the above discussed agents. Application server 344 is representative of one or more application servers, web-servers, or hosted applications. In this example, application server 344 includes FMW console 346, servlet container 348, web services container 350, and data sources connection pool 352.

FMW console 346 is representative of one or more hardware and/or software elements configured to manage aspects of application server 344, such as information related to servlet container 348, web services container 350, and data sources connection pool 334. For example, FMW console 346 may be a browser-based, graphical user interface used to manage a WebLogic Server domain. FMW console 346 may include functionality to configure, start, and stop WebLogic Server instances, configure WebLogic Server clusters, configure WebLogic Server services, such as an object-oriented database connectivity (e.g., a "Java Database Connectivity" (JDBC)) and an object-oriented messaging (e.g., a "Java Messaging Service" (JMS)), configure security parameters, including creating and managing users, groups, and roles, configure and deploy Java EE applications, monitor server and application performance, view server and domain log files, view application deployment descriptors, and edit selected run-time application deployment descriptor elements. In some embodiments, FMW console 346 includes DI plug-in 354 providing FMW console 346 with access to data integration processes in production and may show execution logs with error counts, the number of rows processed, execution statistics, the actual code that is executed, and so forth.

Servlet container 348 is representative of one or more hardware and/or software elements configured to extend the capabilities of application server 344. Servlets are most often used to process or store data that was submitted from an HTML form, provide dynamic content such as the results of a database query, and manage state information that does not exist in the stateless HTTP protocol, such as filling the articles into the shopping cart of the appropriate customer. A servlet is typically a Java class in Java EE that conforms to the Java Servlet API, a protocol by which a Java class may respond to requests. To deploy and run a servlet, servlet container 348 is used as a component of a web server that interacts with servlets. Accordingly, servlet container 348 may extend functionality provided by public web service 356 and data services 358 of web services container 350 as well as access to data pools provided by data sources connection pool 352. Servlet container 348 is also responsible for managing the lifecycle of servlets, mapping a URL to a particular servlet and ensuring that the URL requester has the correct access rights.

In this example, servlet container 348 includes Java EE application 360 associated with DI SDK 362, DI console 364, and runtime web service 366 associated with Java EE agent 368. DI SDK 362 provides a software development kit (SDK) for data integration and ETL design. DI SDK 362 enables automation of work that is common and very repetitive allowing a user to script repetitive tasks.

DI console 364 is a Java Enterprise Edition (Java EE) application that provides Web access to repositories 302. DI console 364 is configured to allow users to browse Design-Time objects, including projects, models, and execution logs. DI console 364 may allow users to view flow maps, trace the source of all data, and even drill down to the field level to understand the transformations used to build the data. In addition, end users can launch and monitor scenario execution through DI console 364. In one aspect, DI console 364 provides administrators with the ability to view and edit Topology objects such as Data Servers, Physical and Logical Schemas as well as to manage repositories 302.

Fact Partitioning Knowledge Module & LKMs Used for Different Sources

As described above, data integration system 200 can enable users to create a logical design which defines, at a high level, how a user wants to manipulate data across different systems.

Figure 5:
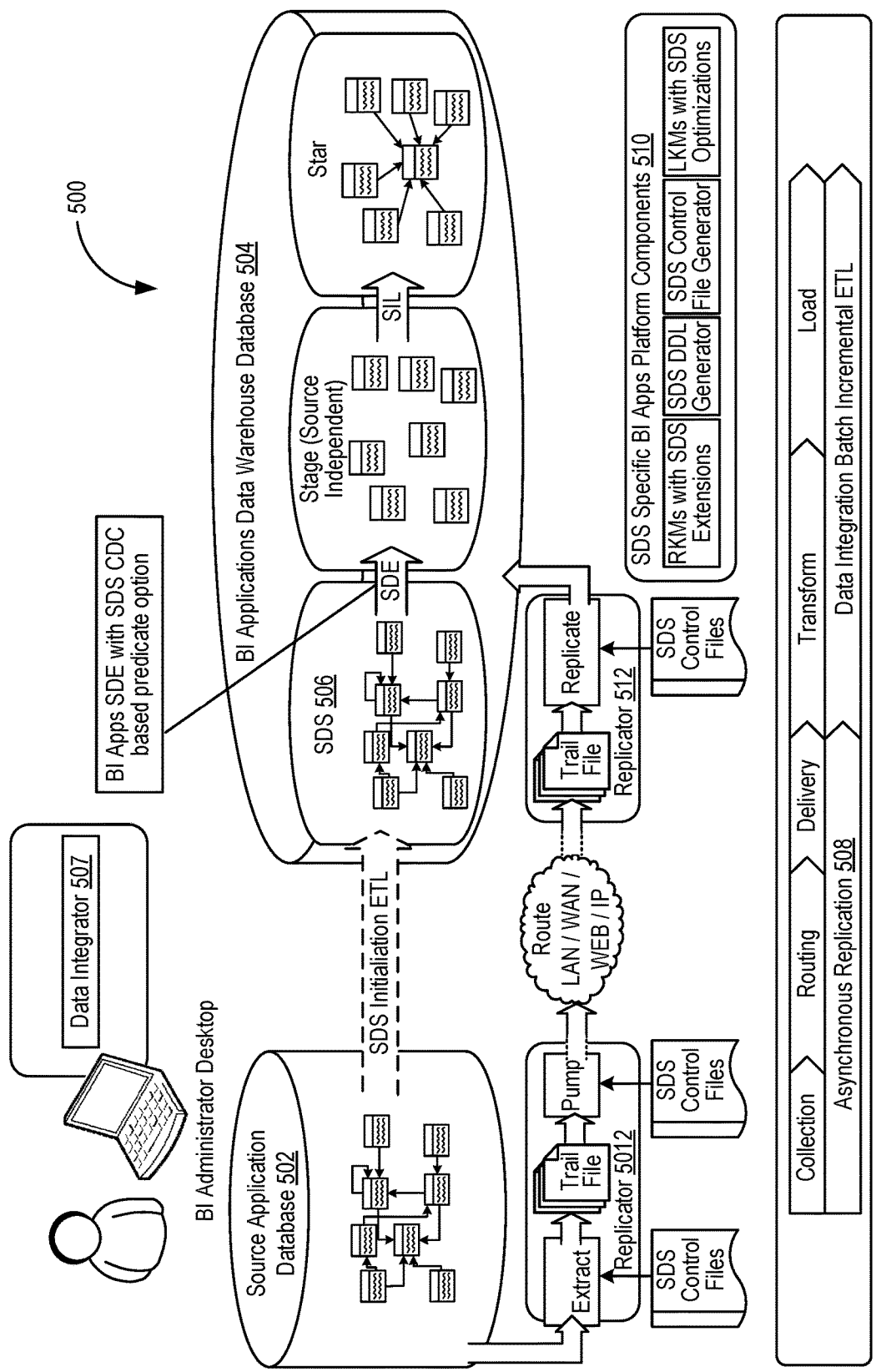
FIG. 5 is a block diagram of deployment of a data warehouse system according to an embodiment of the present disclosure.

FIG. 5 is a block diagram of data warehouse system architecture 500 according to an embodiment of the present disclosure. As shown in FIG. 5, data warehouse system 500 solves many problems associated with data transport from the source 502 (e.g., an On-line Transaction Processing (OLTP) system) to the data warehouse 504 and change data capture required for incremental ETL. In this embodiment, data warehouse system architecture 500 consists of these main components:

A Source Dependent Data Store (SDS) 506—a separate schema on the Business Intelligence (BI) Apps Data Warehouse (DW) 504 database that is a replication of the source systems 502 tables+deletes+additional optimizations for incremental ETL. Each SDS 506 is a separate schema because there can be multiple SDS 506 each having the same object names. The schema provides a separate name space and allows if customers require separate of concerns between admin of DW and each source, e.g. there may be different admins/developers for each source.

A BI Apps DW database 504—the DW schema has to be granted object select privileges so that the E-LT is a cross schema select rather than having to ship the data to a data integration agent—this gives a considerable performance improvement in the ETL. BI Apps Platform tables in some flavors of SDS 506 are used to store the replication state to determine whether the SDS 506 schema is loaded and consistent and can be extracted from.

Data Integration—Data Integrator 507 metadata is used to store the definitions used to generate the SDS 506 and a replication processes 508.

A BI Application SDS Component 510—Components used to generate the SDS 506 schema and to generate the replication processes 508.

The Replication Process 508—Replicators 512 deployed on both database systems that perform: (1) on the source database system 502—continuous asynchronous change data capture (CDC) at a low level in the database, then compresses and ships the changed data across the network and, (2) on the target database system 504—receives the changed data from one or more source systems and loads them into the target database 504 (into the SDS 506 schemas, e.g., one per source).

A Cloud Adaptor—Data Integrator 507 based process that loads the SDS 506 tables from .csv data files downloaded from a remote Cloud Application deployment via a Universal Content Manager (UCM).

Cloud Replicator 512—an independent process deployed in the BI Domain that replicates data using the respective source system 502 Web services and loads to the SDS 506. In some examples, a dynamic warehouse interface layer may be utilized to implement the features describe herein. For example, the dynamic warehouse interface layer may be configured to extract data from the source 502 and/or from the SDS 506. The interface layer, when connecting directly to the source 502, may be expected to fetch data by referring to the View Object (VO) names (e.g., a naming convention of the BI server). Also the datatypes of the VOs are not exactly the same as the datatypes that are supported in the database 504. For example "DOUBLE PRECISION" is a datatype in some BI servers (e.g., the source 502) but that exact datatype doesn't necessarily exist at the target database 504 (e.g., the target 504 may use "Number" instead).

The data can be staged in the SDS 506 when a direct connection to the source is not possible. For example when the source 502 is deployed in the cloud. In some examples, the SDS 502 may be needed to be implemented on a computing system managed by the same entity that manages the target database 504, as the warehouse may be supported by database technology of that entity, and the SDS 506 is meant to be an additional schema on the warehouse database 504. Ideally the SDS 506 should be a replica of the source 502. Thus, for every table that exists on the source 502, there should be an exact replica of it in the SDS 506. In such a case (where SDS 506 is exact replica of the source 502) switching between the source 502 and the SDS 506 is equivalent to switching the connections.

However in some cases, the SDS 506 cannot be an exact replica of the source 502 for the following reasons:
1) The source 502 may have VOs with long names. In some examples, the SDS 506 may be implemented with tables that have maximum character lengths (e.g., only 30 characters long, etc.).
2) Source 502 may have VOs with columns which have long names. In some examples, the SDS 506 may be implemented with tables that have columns with maximum character lengths.
3) The source 502 may be implemented using a different technology from the SDS 506, hence the datatypes that are present on the source 502 may not be used as-is in the SDS 506.

Thus, one challenge in this case, is how can the dynamic interface layer, switch between a direct Source 502 connection that has long VO names and different datatypes to an SDS 506 which is on a database that has maximum character limits (e.g., 30 character long table/column names) and different datatypes. One option would be to create two sets of mappings for each of these, but then it would mean duplicating the effort in creating those mappings which have would similar transformation logic. Additionally from an ongoing maintenance perspective, it would become increasingly difficult as the code changes, if any mappings/changes have to be dual maintained.

When a direct ETL connection exists, the following steps will occur:
a.1) The interface layer fires an SQL-like query when using the direct connection. These would have the long VO names.
a.2) The data is then staged into a staging table without any transformations.
a.3) The data from the staging table is then transformed and loaded into the target table.

When no direct connection exists, the follow steps will occur:
b.1) SDS tables are created in the SDS schema with names of the target database restrictions i.e., names under 30 characters and using target database equivalent datatypes (e.g., create column as NUMBER when it is DOUBLE PRECISION in the source)
b.2) The data from the source is extracted to flat files and the flat files are transferred securely.
b.3) There is a metadata mapping table in the ETL Repository that stores the mapping between long names in the source and the short names in the SDS.
b.4) When loading the data from the files to the SDS, the mapping table is referred to, and the data gets loaded to the equivalent shortened tables/columns. At this point the data is loaded to the SDS and the Dynamic Warehouse Interface Layer comes into play.
b.5) The Dynamic Warehouse interface layer acts as if it is connecting to the source directly and generates the same SQL-like query that is generated in step (a.1) above. It then parses the query and translates the VO table/column long names to the short names using the mapping table in the repository. This is not trivial as the query is comprised of many nested queries and multiple VOs along with "joins" and "where" conditions. Regular expressions are used to parse/extract the table names and column names and these are then replaced with the shorter names. Since the data already resides in the SDS, instead of creating another staging table, a view is created as though it is the staging table. The view has the parsed/modified query as its SQL query.
b.6) Now, the transformation layer, which requires the staging table to be present, runs. Instead of the table it expects, there is now a view with the same name. The transformation query will work just fine totally oblivious of the fact that it is querying a view instead of a table. Thus the same layer is able to dynamically switch between the two sources.

Figure 6:
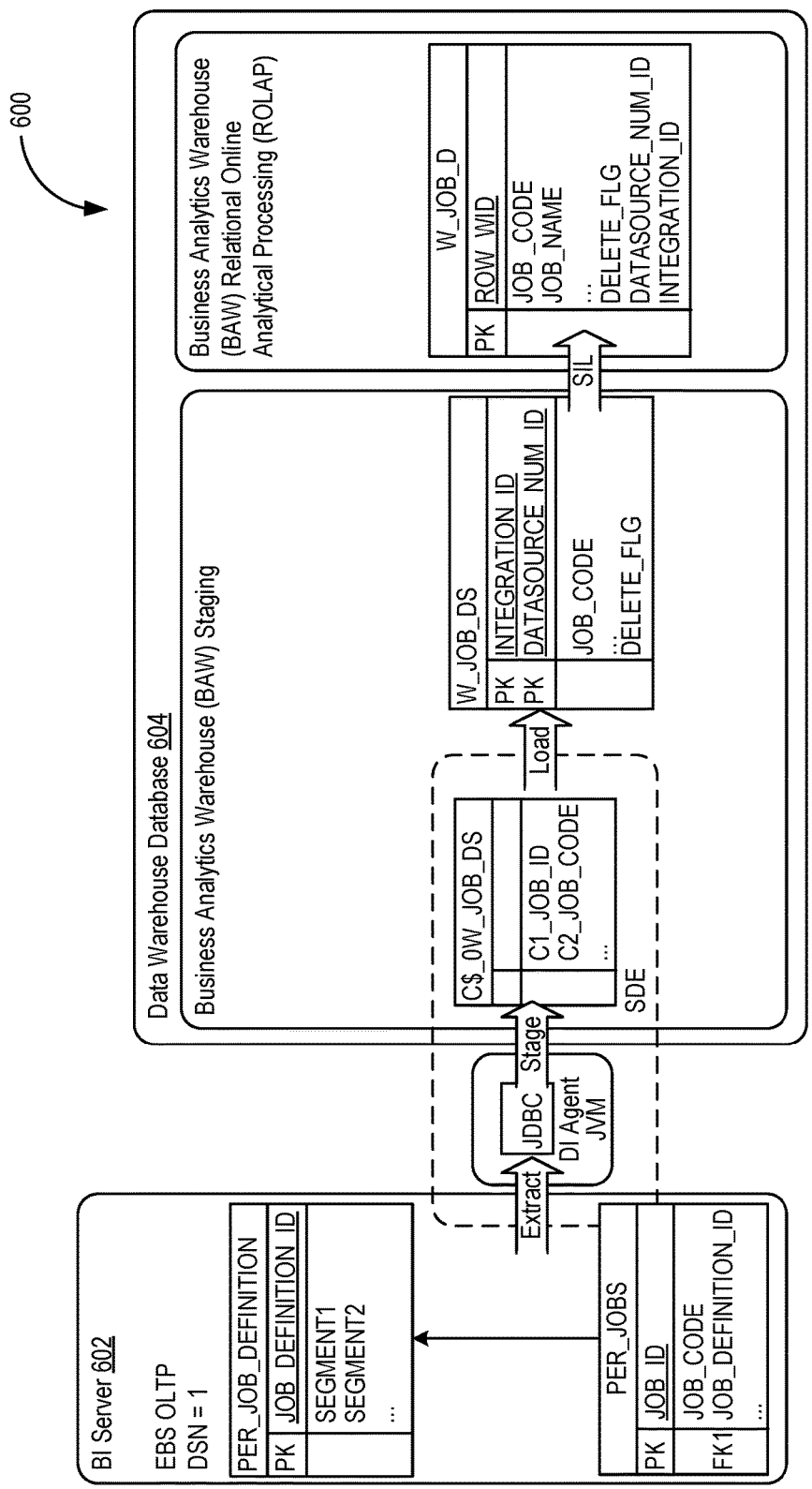
FIG. 6 illustrates an incremental ETL architecture using an Job Dimension example in one embodiment according to the present disclosure.

FIG. 6 is a block diagram illustrating an incremental ETL architecture 600 using a Job dimension example in one embodiment according to the present disclosure. In this example, data may be sourced from a BI server 602 that is remote to a data warehouse 604. In some example, this process may also be performed if the BI server 602 is directly connected to the computing system that houses the data warehouse 604. In architecture 600, the data may be received over a network from the BI server 602 and transferred into staging. The data may then be loaded into the data warehouse 604. In some examples, FIG. 6 illustrates how the E-LT might be performed without SDS present. In this approach the source tables are joined and the data may be shipped to the DI agent and then loaded to a working table before the integration step loads the tables into the target table.

Figure 7:
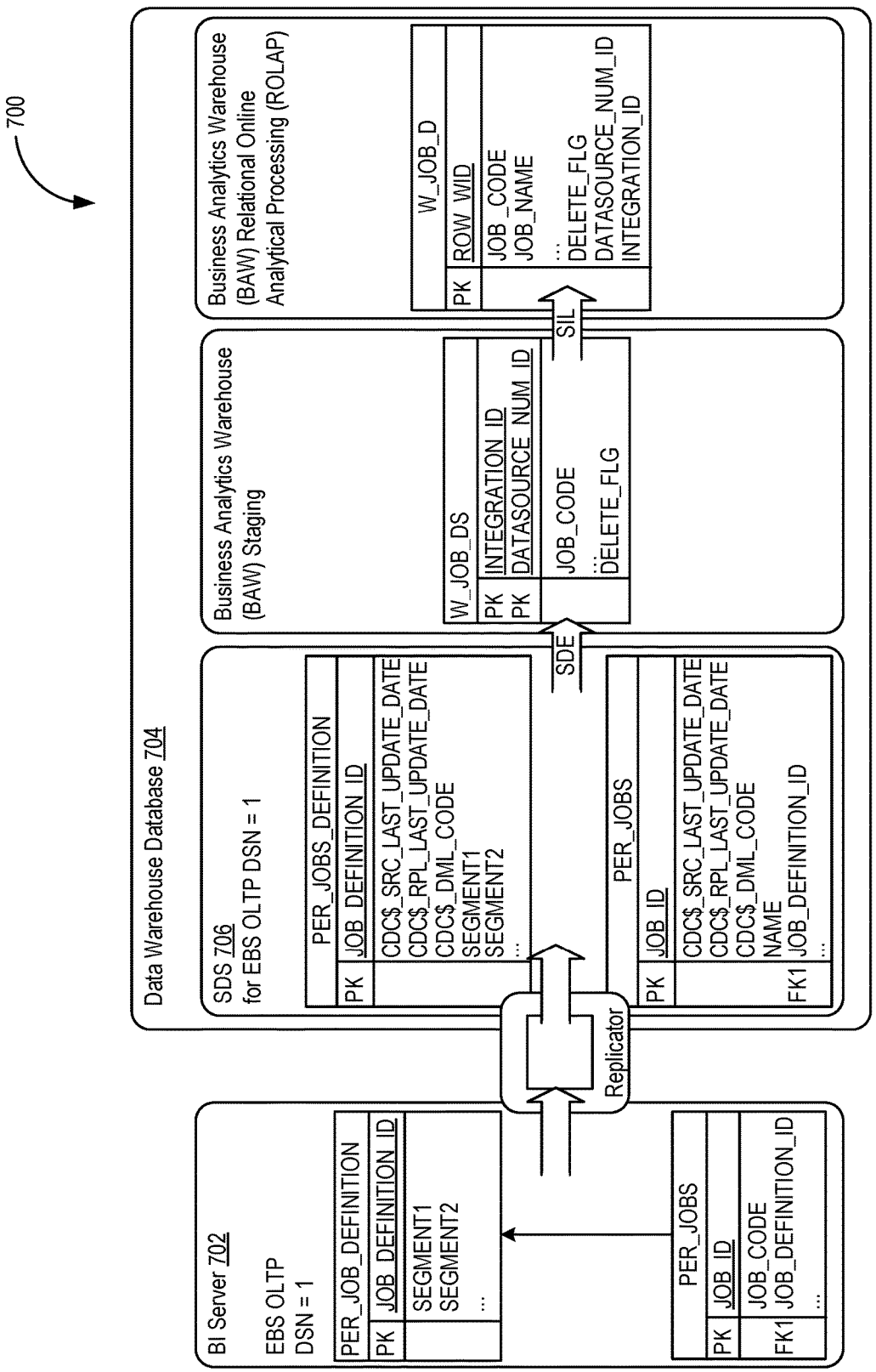
FIG. 7 illustrates another incremental ETL architecture using an Job Dimension example in one embodiment according to the present disclosure.

FIG. 7 is a block diagram illustrating an incremental ETL architecture 700 using a Job dimension example in one embodiment according to the present disclosure. In this example, data may be sourced from BI server 702 that is remote to data warehouse 704. In some example, the data may be received over a network from the BI server 602 and stored in local Source-Dependent data store (SDS) 706 schema. The data may then be loaded to staging, and then loaded into data warehouse 704. In some aspects, FIG. 7 illustrates how the E-LT might be performed with an SDS present. In this approach the source tables may be replicated by another process (e.g., using a replication process) to copy local data to the target table and a temporary view is created on the replicated tables. The integration process may then proceed as in FIG. 6, however this time the SQL may select from a temporary view on top of replicated tables rather than the temporary working table. In some examples, it may be possible to dynamically switch between processing according to FIG. 6 and processing according to FIG. 7, with the same mapping (metadata) definition for the data transformation of the data being loaded.

As discussed above, one or more knowledge modules may be proposed for the physical design. A knowledge module (KM) is a component that implements reusable transformation and ELT (extract, load, and transform) strategies across different technologies. In one aspect, KMs are code templates. Each KM can be dedicated to an individual task in an overall data integration process. The code in KMs appears in nearly the form that it will be executed with substitution methods enabling it to be used generically by many different integration jobs.

The power of KMs lies in their reusability and flexibility—for example, a loading strategy can be developed for one fact table and then the loading strategy can be applied to all other fact tables. In one aspect, all mappings that use a given KM inherit any changes made to the KM. In some embodiments, five different types of KMs are provided, each of them covering one phase in a transformation process from source to target, such as an integration knowledge module (IKM), a loading knowledge module (LKM), and a check knowledge module (CKM).

In various embodiments, LKMs optimize incremental loading from the source using fact partitioning. In one example, data from a BI Server source is loaded into a target database using a Data Integration Agent to transfer the data into a dynamically created temporary target table (e.g., C$ Tables). There will be one C$ table for each source data set (one per LKM). In various embodiments, each LKM can determine how to optimize incremental loading from the source.

Typically, indexes are created on fact tables to speed up execution of the join and filter operations. End users can choose from several options including the creation of bitmap indexes which can greatly improve the efficiency of joins between large fact tables and smaller dimension tables in a star schema. However, these bitmap index can be turned off during incremental loads because they the indexes are essentially recreated across all the data. Partitioning allows a fact table to be partitioned such that local bitmap indexes can be created allowing only select partitions to be updated during an incremental load and their local bitmap indexes to be updated.

Accordingly, an LKM can determine which partitions are to be updated and selectively disable their respective bitmap indexes during an incremental load. The local indexes can be later re-enabled to speed up the execution of the join and filter operations.

In one embodiment, the LKM scans one or more staging tables to identify what changes are incoming. The LKM can determine what local indexes correspond to the partitions affected by the incoming changes.

Additionally, in some examples, it may be possible to determine, prior to processing the data (loading the data to the data warehouse), which partitions of a large set of data are going to be affected by the loading. For example, if a fact table stores data records for the last 10 years, but the data set being processed is just the data from the last month, data indexing may only need to be disabled for the partition for the last month. Thus, the data indexing for the data past the last month will not need to be disabled, thus reducing the total amount of processing cost of disabling and rebuilding the indexes. One implementation for determining the affected partitions beforehand includes looking at the data set about to be refreshed into the target. Chunk up the data set and determine which records are going to land in which partitions. Thus, the system may be able to know in advance that the data in that partition will need to be refreshed, and it can disable and then rebuild the indexes just for that dataset.

In some examples, this is a key optimization strategy. For example, if only a month of data is stored, and it is desired to update just that amount, the cost of inserting and updating that data is quite small. But, as the data set grows, it becomes more intensive. In the past, either a blanket drop and rebuild process was employed, which had a very high processing cost for large data sets, or a heuristic would be employed. The heuristic rule might indicate that only data for the last two partitions (or some arbitrary number less than all) would be changed. However, the problem with using such a heuristic is that if changes occurred twelve months ago, the system would have very poor processing speed because it would need to disable the indexes for the last twelve months. The other problem is that the system would need to err on the side of caution, by rebuilding indexing for a larger period than was probably actually necessary. The same problems would occur with the use of keys.

As such, it is beneficial to first determine how much data of a data set is about to be refreshed in the target. Once that is determined, the system can chunk up the data that has been determined to be refreshed, and determine which records are going to land in which partitions. Only this data needs to have the indexes disabled and then rebuilt. Thus, the target partitioning strategy is the key to looking ahead to determine what data should dynamically have its indexes disabled during the loading of that data into the target.

Further, there are instances when users or developers may create their own partitioning schemes. For example, a user may change a partitioning strategy that was already in place and/or create a custom partitioning strategy (e.g., partition by customer, by organization, and/or by time, etc.). Thus, the indexes may have been placed into the dataset by an application and/or a customer. Still, the incremental loading processes described herein are capable of dynamically handling any partitioning/indexing scheme by determining a strategy to take a target partitioning strategy and applying to incoming data; essentially doing a look-ahead. The mechanics are dynamic and work regardless of the target partitioning/indexing strategy. In some embodiments, this may be possible by implementing the techniques described herein in a data integration module that can be applied to any fact table.

Figure 8:
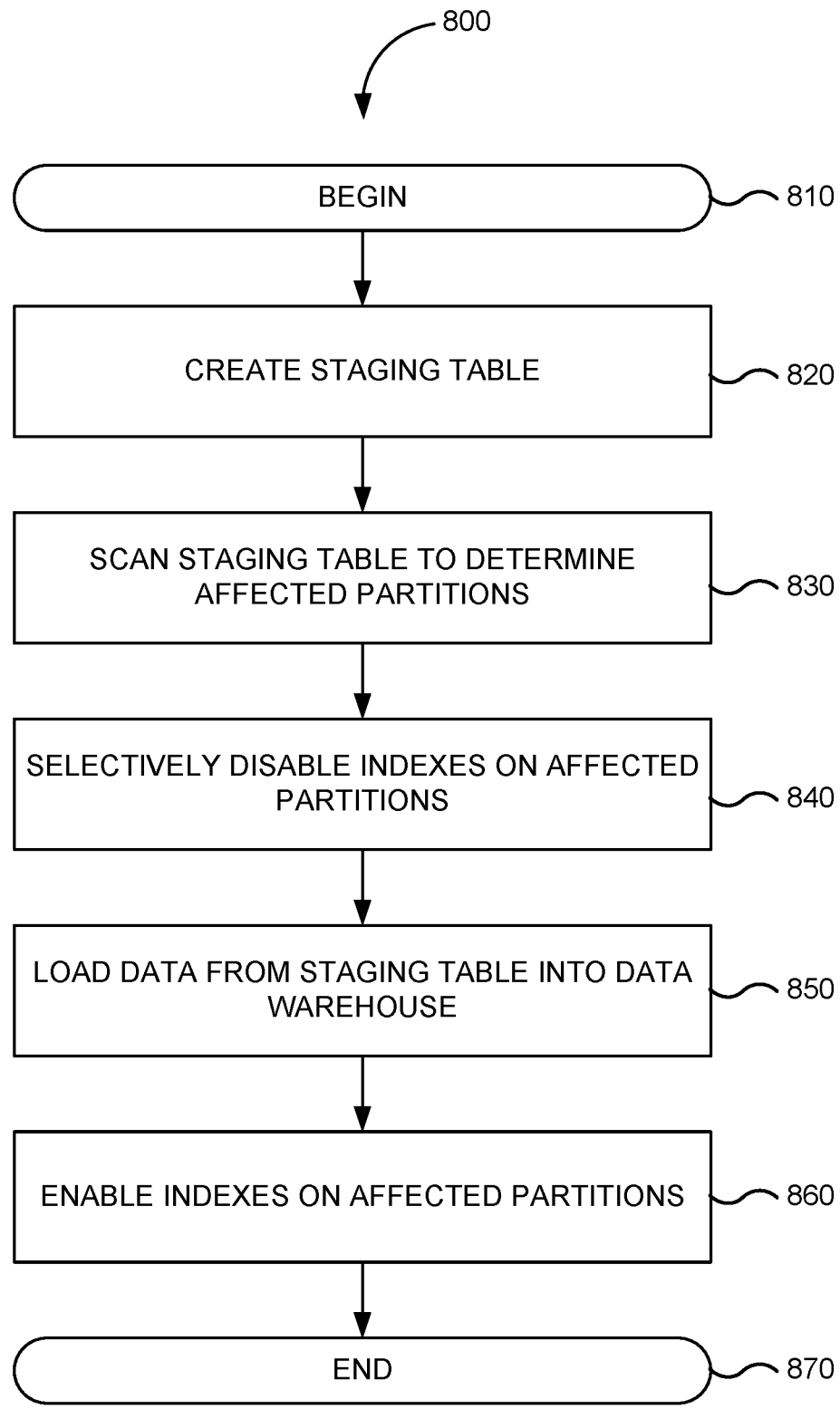
FIG. 8 is a flowchart of a method for optimizing incremental loads into a data warehouse in accordance with an embodiment of the present disclosure.

FIG. 8 is a flowchart of method 800 for optimizing incremental loads into a data warehouse in accordance with an embodiment of the present disclosure. Implementations of or processing in method 800 depicted in FIG. 8 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Each of the steps of any of the methods described herein and below may be performed in any order, may be omitted (or otherwise skipped), may be replaced by other steps, and/or may be performed repeatedly or recursively, as desired. Method 800 depicted in FIG. 8 may begin at step 810.

At step 820, one or more staging tables may be created. A staging table may include all data that is to be incrementally loaded into the data warehouse. Each staging table can be sourced from the same source or from a different source.

At step 830, the one or more staging tables may be scanned to determine one or more affected partitions. In one embodiment, a data dictionary that defines the structure of the staging tables may be interpreted to determine incoming data. Affected partitions may be determined or identified in advance of the loading by analyzing the data for particular patterns or data that match partitions of the target. For example, the target table may be partitioned by month, so records with data for different months will fall into different partitions of the target. When incoming data is loaded into the staging table (working table), for example, temporarily, the different partitions (e.g., months) in the working table can be identified. There may be 1000 records in the working table but only a few distinct months might be found. The system can then determine, based at least in part on the distinct months that are found, which partitions need to be processed, and the data to be processed is in the working table. So, the partitions on the target may be prepared (e.g., the indexes may be disabled on just those partitions), the target table may be loaded with the data from the working table (according to the appropriate partitions), and then the indexes may be rebuilt for just those partitions.

At step 840, one or more indexes on one or more fact tables into which incoming data is to be loaded may be disabled based on the affected partitions. In step 850, data may be loaded from the staging table into the data warehouse. In step 860, the disabled indexes on the affected partitions may be re-enabled. FIG. 8 may end at step 870.

Figure 9:
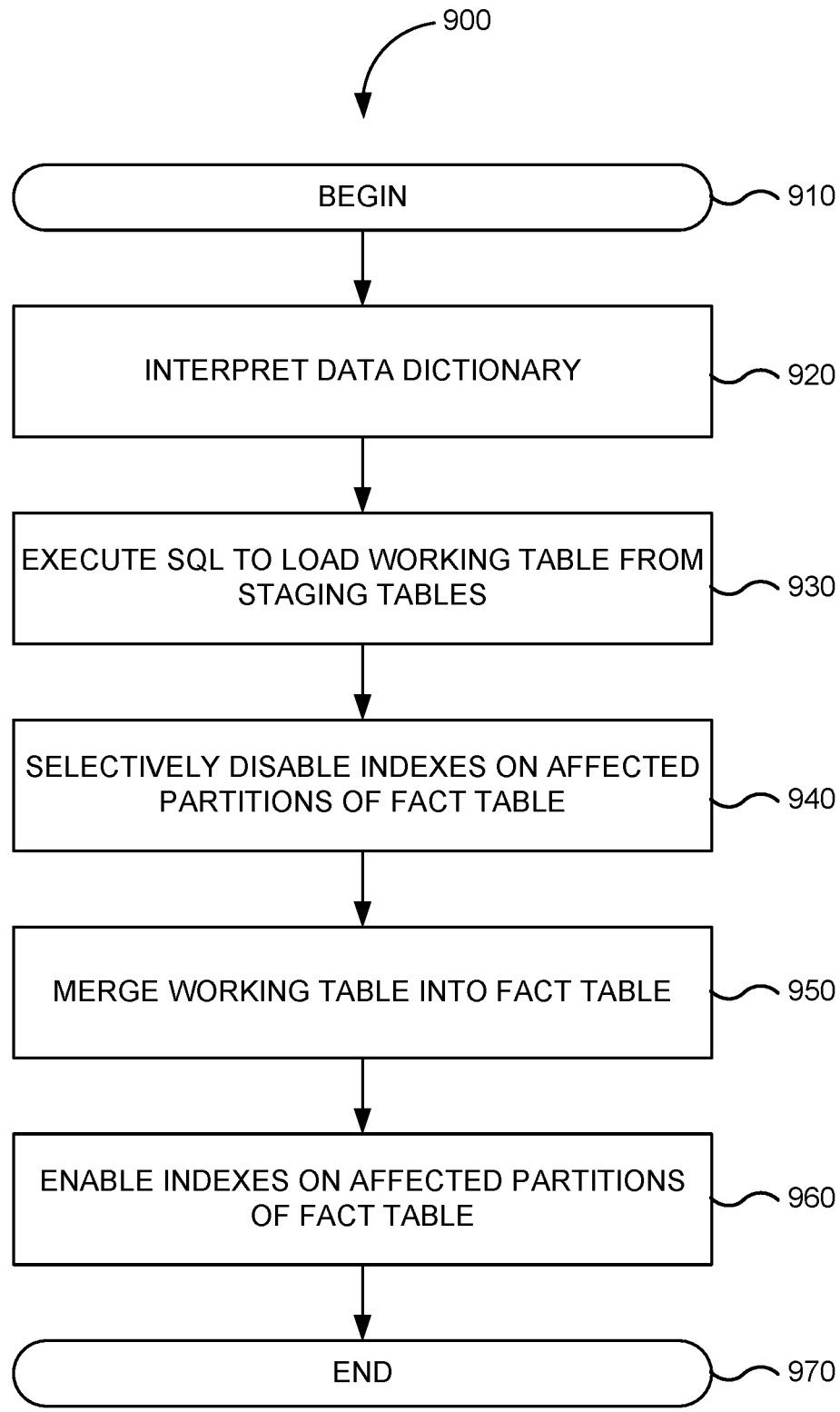
FIG. 9 is a flowchart of a method for optimizing incremental loads into a data warehouse in accordance with an embodiment of the present disclosure.

FIG. 9 is a flowchart of method 900 for optimizing incremental loads into a data warehouse in accordance with an embodiment of the present disclosure. Implementations of or processing in method 900 depicted in FIG. 9 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 900 depicted in FIG. 9 may begin at step 910.

At step 920, a data dictionary that defines the structure of one or more staging or working tables may be interpreted. Interpreting the data dictionary may provide a partitioning strategy for the data in the data warehouse. In step 930, SQL may be executed to load a working table from one or more staging tables. At this time, the incoming data may be understood in terms of which partitions are affected by having incoming data.

At step 940, one or more indexes on one or more fact tables into which incoming data is to be loaded may be disabled based on the affected partitions. At step 950, the working table may be merged into the fact table. At step 960, the disabled indexes on the affected partitions may be re-enabled. FIG. 8 may end at step 970.

In some embodiments, data integration system 200 can switch at runtime between DI agent extracting from BI server or sourcing locally from an SDS and to use different data types/physical columns depending on the technology.

An LKM can be used to move the data from the source Application database to the target BI Applications DW database. A key feature of this LKM developed specifically for BI Applications is that the data from the source system may be transported in 3 different ways and, using a parameters set in Configuration Manager, the mode can be selected to suit how the system has been setup, thereby optimizing ETL performance. The transport modes include a JDBC mode—the data is moved via JDBC from the source up to the DI Agent and from the DI Agent down to the Target. The DI Agent transfers the data into a dynamically created temporary target table. This is the default mode. The transport modes include Database Link mode—the data is moved over a predefined database link. A view is created on the source database, and a synonym is used instead of a temporary target table to reference the data across the database link. The transport modes also include SDS mode—the data is referenced directly from an SDS replicated table. The SDS table is continuously and asynchrounously replicated using a replicator. A view is used instead of a temporary target table and the view references the source data in the local SDS schema.

The default mode is selected as it works in all deployments, however the other modes if they've been setup and enabled allow significant improvements in ETL performance. JDBC mode can be detected based on the default settings for the underlying variables. In this mode data is transferred from the source via JDBC. This is the slowest mode amongst the three. Database Link Mode allows data to be transferred from the source via a DB Link. This mode is usually faster than the JDBC mode assuming the network between the source and the warehouse remains constant. Database Link Mode can be used when the source database is standard and a compatible DB Link can be created from the Warehouse to the source.

SDS Mode can be used when the LKM uses the SDS as the source. A view is created pointing to the SDS schema and that view is used to insert data into the target. SDS resides on the same database as the warehouse. This is the fastest mode as no data is moved over the network. This mode can be used when you have an SDS deployed and populated with the data to be loaded. Accordingly, the LKM can dynamically switch between modes based on the source and data types.

In some examples, it may be desirable to define a single set of mappings to move data from a source (e.g., a BI server) into a database (e.g., a data warehouse database). There are at least two potential scenarios for loading data in a data warehouse. In some example, there may be a direct connection between the target computing system (e.g., that hosts the warehouse database) and the BI server. However, in some examples, the connection may be indirect (e.g., the BI server may be behind a firewall). In the second scenario, it may not be desirable to have two copies of mappings to maintain (e.g., mapping for both direct and indirect connections). Additionally, which source (BI server or SDS table) from which to source the data should be a deployment option. One business/development benefit of this deployment-time option (e.g., similar to flipping a switch) is that there will be less data to maintain (only one mapping will be needed). It is also a deployment benefit in that customers can develop solutions using one approach, and later dynamically point the LKM to an alternative source.

As noted, in some example, the data source may not be directly connected to the target (e.g., behind a firewall, in the cloud, accessible only through a network connection, etc.). In this case, additional processes may be implemented to load the data to the data warehouse. For example, a cloud process which runs in batch made may extract data from the target (e.g., a BI server) and convert the data into a set of files. These files may then be loaded into database tables without making new mappings. On solution is to create a behind-the-scenes switching mechanism whereby the system is able to transpose the connection directly to the BI server instead of using the local connection to the database. Then, a separate process could move the data from the target, to the file, and then the data warehouse. This additional processing step may be done transparently to the mapping itself, and may not be considered a mapping at all.

In some aspects, the mapping may be performed at design-time and may be unaware of the source of the data. Thus, this becomes a deployment option. Once deployed, the system will either source from a BI server directly, or there will be some additional processing that extracts the data, loads it into a table, and then at runtime, connects to the table instead of the server. Additionally, this creates the ability to source from the two different sources, while moving from a design-time decision to a deployment-time decision. The mapping may not change at all, but the mapping may be configured to source from the local data store instead of the BI server. Some challenges in implementing this functionality included enabling use of a parameter in a data integrator that enables users to switch from one source to another. Additionally, data type mapping was enabled because the data types of data in a BI server may not always match up with the data types of a database or data warehouse. For example, data represented in floating point type in a BI server might need to be converted to text format for storage in the data file, and then loaded in the database in a number format. In another example, data from the BI server in a string type may need to be converted into text format for the data file (table), and then transposed into a var char format (or the like). As such, a data type mapping may need to be maintained that can enable the effective conversion of BI server data types into a temporary data type for storage in the SDS table (text file), and then into data base data types.

Figure 10:
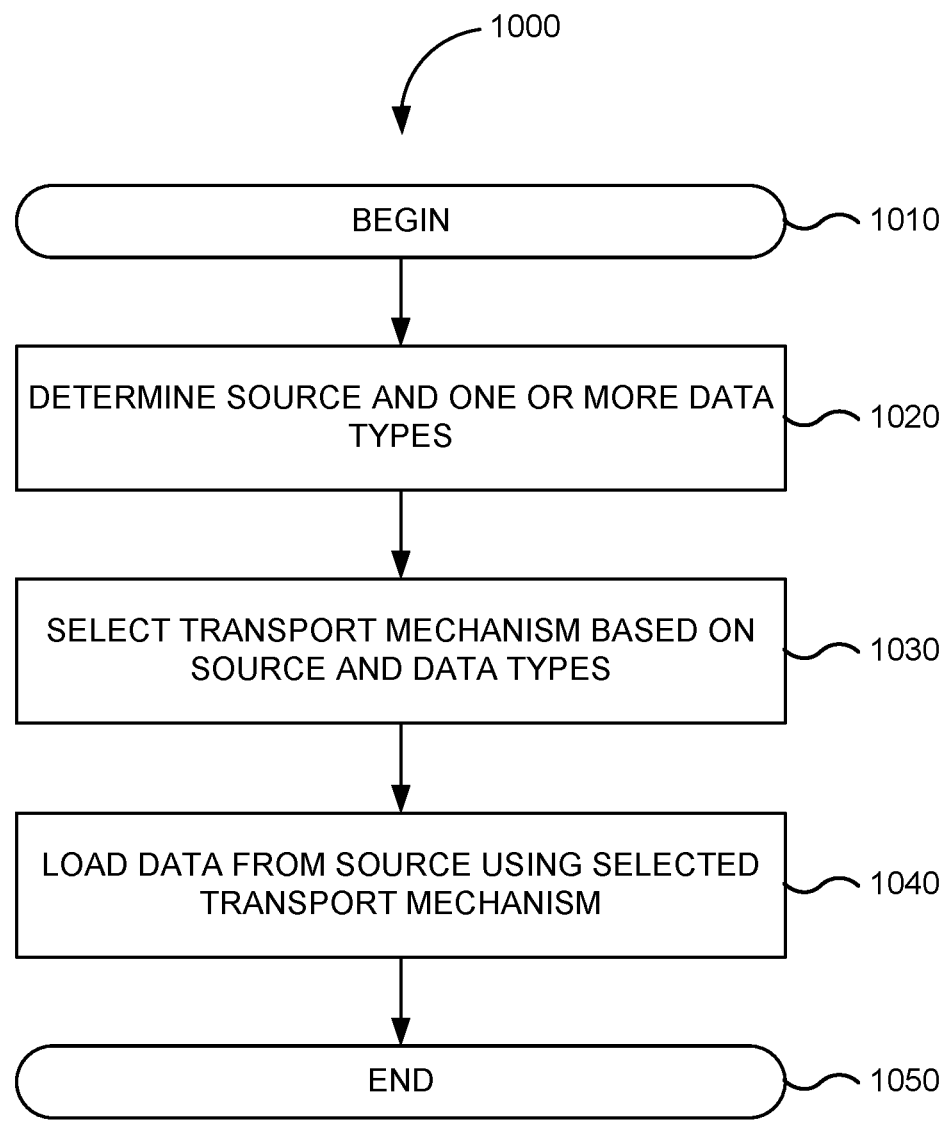
FIG. 10 is a flowchart of a method for tech switching in accordance with an embodiment of the present disclosure.

FIG. 10 depicts a flowchart of method 1000 for tech switching in accordance with an embodiment of the present disclosure. Implementations of or processing in method 1000 depicted in FIG. 10 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1000 depicted in FIG. 10 may begin at step 1010.

At step 1020, the LKM may determine the source and the data types. At step 1030, a transport mechanism may be selected based on the determined source and data types. At step 1040, data may be loaded from the source using the selected transport mechanism. FIG. 10 may end at step 1050.

Conclusion

Figure 11:
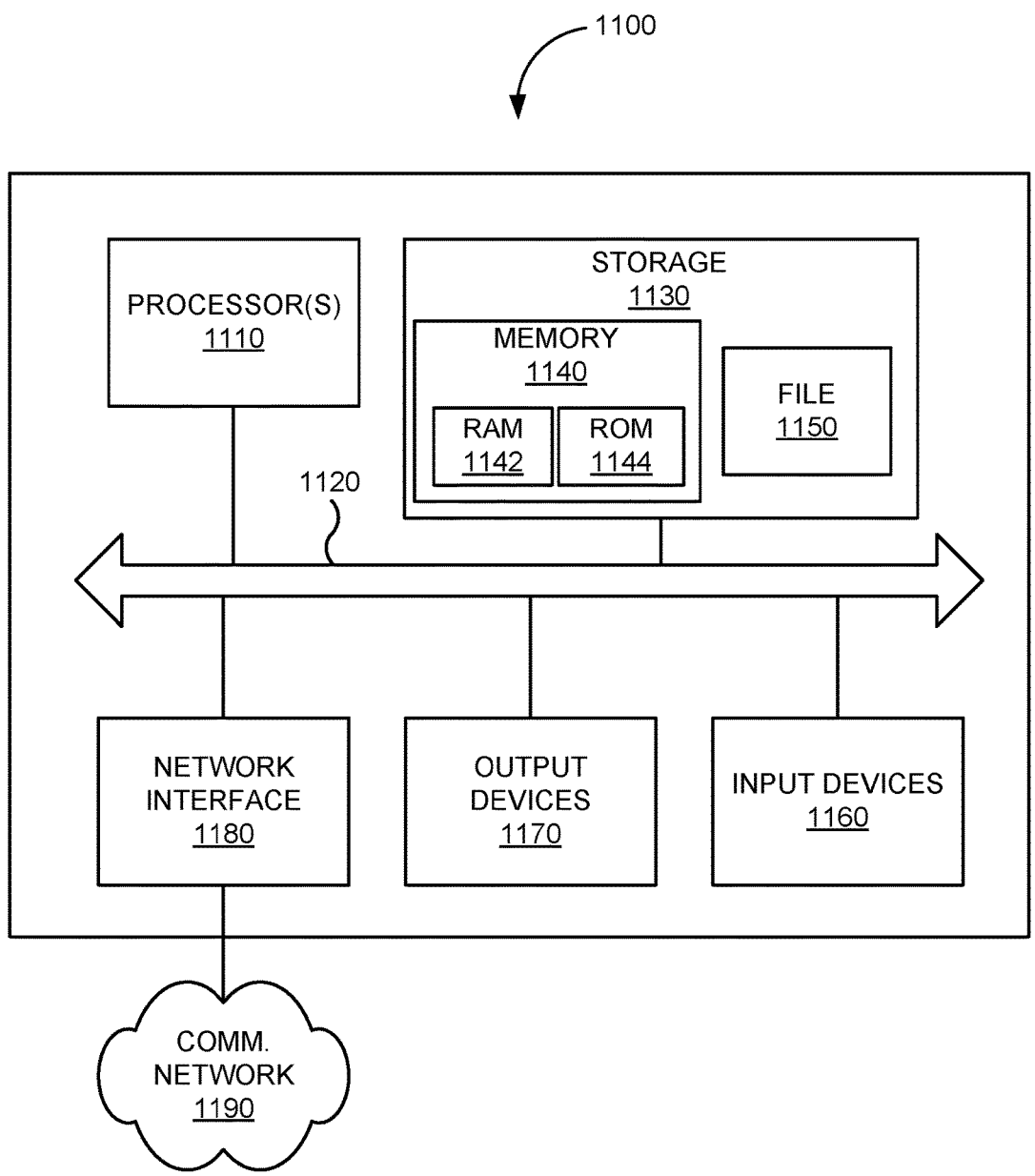
FIG. 11 is a simplified block diagram of a computer system that may be used to practice embodiments of the present disclosure.

FIG. 11 is a simplified block diagram of computer system 1100 that may be used to practice embodiments of the present disclosure. As shown in FIG. 11, computer system 1100 includes processor 1110 that communicates with a number of peripheral devices via bus subsystem 1120. These peripheral devices may include storage subsystem 1130, comprising memory subsystem 1140 and file storage subsystem 1150, input devices 1160, output devices 1170, and network interface subsystem 1180.

Bus subsystem 1120 provides a mechanism for letting the various components and subsystems of computer system 1100 communicate with each other as intended. Although bus subsystem 1120 is shown schematically as a single bus, alternative embodiments of the bus subsystem may utilize multiple busses.

Storage subsystem 1130 may be configured to store the basic programming and data constructs that provide the functionality of the present disclosure. Software (code modules or instructions) that provides the functionality of the present disclosure may be stored in storage subsystem 1130. These software modules or instructions may be executed by processor(s) 1110. Storage subsystem 1130 may also provide a repository for storing data used in accordance with the present disclosure. Storage subsystem 1130 may comprise memory subsystem 1140 and file/disk storage subsystem 1150.

Memory subsystem 1140 may include a number of memories including a main random access memory (RAM) 1142 for storage of instructions and data during program execution and a read only memory (ROM) 1144 in which fixed instructions are stored. File storage subsystem 1150 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Input devices 1160 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 1100.

Output devices 1170 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1100.

Network interface subsystem 1180 provides an interface to other computer systems, devices, and networks, such as communications network 1190. Network interface subsystem 1180 serves as an interface for receiving data from and transmitting data to other systems from computer system 1100. Some examples of communications network 1190 are private networks, public networks, leased lines, the Internet, Ethernet networks, token ring networks, fiber optic networks, and the like.

Computer system 1100 can be of various types including a personal computer, a portable computer, a workstation, a network computer, a mainframe, a kiosk, or any other data processing system. Due to the ever-changing nature of computers and networks, the description of computer system 1100 depicted in FIG. 11 is intended only as a specific example for purposes of illustrating some embodiments of the computer system. Many other configurations having more or fewer components than the system depicted in FIG. 11 are possible.

Although specific embodiments of the disclosure have been described, various modifications, alterations, alternative constructions, and equivalents are also encompassed within the scope of the disclosure. The described disclosure is not restricted to operation within certain specific data processing environments, but is free to operate within a plurality of data processing environments. Additionally, although the present disclosure has been described using a particular series of transactions and steps, it should be apparent to those skilled in the art that the scope of the present disclosure is not limited to the described series of transactions and steps.

Further, while the present disclosure has been described using a particular combination of hardware and software, it should be recognized that other combinations of hardware and software are also within the scope of the present disclosure. The present disclosure may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the disclosure as set forth in the claims.

Various embodiments of any of one or more disclosures whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an disclosure presented within this disclosure. The logic may form part of a software program or computer program product as code modules become operational with a processor of a computer system or an information-processing device when executed to perform a method or process in various embodiments of an disclosure presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented disclosures.

The disclosed examples, implementations, and various embodiments of any one of those disclosures whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more disclosures whose teachings may be presented within this disclosure. Hence, the present descriptions and drawings should not be considered in a limiting sense, as it is understood that a disclosure is in no way limited to those embodiments specifically illustrated.

Accordingly, the above description and any accompanying drawings, illustrations, and figures are intended to be illustrative but not restrictive. The scope of any disclosure presented within this disclosure should, therefore, be determined not with simple reference to the above description and those embodiments shown in the figures, but instead should be determined with reference to the pending claims along with their full scope or equivalents.

What is claimed is:

1. A method comprising:
   identifying, by a computing system, a plurality of data sources comprising a first data source and a second data source of data to be loaded to a data warehouse, the first data source comprising a business intelligence server and the second data source comprising a local table of the computing system;
   receiving, by the computing system, information about the plurality of data sources and one or more data types of the data associated with the plurality of data sources;
   selecting, by the computing system, a first transport mechanism from among a plurality of selectable transport mechanisms based at least in part on the first data source comprising the business intelligence server;
   loading, by the computing system, a first subset of the data from the first data source into the data warehouse using the first transport mechanism;
   identifying, at deployment time and by the computing system, that a second subset of the data is to be loaded from the second data source;
   selecting, by the computing system, a second transport mechanism from among the plurality of selectable transport mechanisms based at least in part on the second data source comprising the local table of the computing system and a particular data type of the one or more data types that corresponds to the local table of the computing system, the second transport mechanism being different from the first transport mechanism; and
   loading, by the computing system, the second subset of the data from the second data source into the data warehouse using the second transport mechanism.

2. A computer-readable medium storing program code that when executed by a processor of a computing system causes the processor to perform operations comprising:
   identifying a plurality of data sources comprising a first data source and a second data source of data to be loaded to a data warehouse, the first data source comprising a business intelligence server and the second data source comprising a local table of the computing system;
   receiving information about the plurality of data sources and one or more data types of the data associated with the plurality of data sources;
   selecting a first transport mechanism from among a plurality of selectable transport mechanisms based at least in part on the first data source comprising the business intelligence server;
   loading a first subset of the data from the first data source into the data warehouse using the first transport mechanism;
   identifying, at deployment time, from which of the plurality of data sources to source a second subset of the data;
   selecting a second transport mechanism from among the plurality of selectable transport mechanisms based at least in part on an identification and a particular data type of the one or more data types that corresponds to the identified data source, the second transport mechanism being different from the first transport mechanism; and loading the second subset of the data from the identified data source into the data warehouse using the second transport mechanism.

3. A system, comprising:
a memory configured to store computer-executable instructions; and
a processor configured to access the memory and execute the computer-executable instructions to at least:
identify a plurality of data sources comprising a first data source and a second data source of data to be loaded to a data warehouse, the first data source comprising a business intelligence server and the second data source comprising a local table of the system;
select a first transport mechanism from among a plurality of selectable transport mechanisms based at least in part on the first data source comprising the business intelligence server;
load a first subset of the data from the first data source into the data warehouse using the first transport mechanism;
receive information about the plurality of data sources and one or more data types of the data associated with the plurality of data sources;
identify, at deployment time, from which of the plurality of data sources to source a second subset of the data;
select a second transport mechanism from among the plurality of selectable transport mechanisms based at least in part on the identification and a particular data type of the one or more data types that corresponds to the identified data source, the second transport mechanism being different from the first transport mechanism; and
load the second subset of the data from the identified data source into the data warehouse using the second transport mechanism.

4. The method of claim 1, further comprising receiving at least the second subset of the data from the first data source.

5. The method of claim 1, wherein selecting the second transport mechanism from among the plurality of selectable transport mechanisms based at least in part on the second data source comprising the local table of the computing system and the particular data type of the one or more data types comprises selecting an object-oriented database connectivity transport mechanism.

6. The method of claim 1, wherein selecting the second transport mechanism from among the plurality of selectable transport mechanisms based at least in part on the second data source comprising the local table of the computing system and the particular data type of the one or more data types comprises selecting a Database link transport mechanism.

7. The method of claim 1, wherein selecting the second transport mechanism from among the plurality of selectable transport mechanisms based at least in part on the second data source comprising the local table of the computing system and the particular data type of the one or more data types comprises selecting a source-dependent data store (SDS) transport mechanism.

8. The method of claim 1:
wherein identifying that the data is to be loaded from the second data source further comprises identifying that the data is to be loaded from the second data source using a same mapping as used to connect to the first data source;
wherein the same mapping is an only mapping maintained by the computing system;
wherein loading the data from the second data source involves using the same mapping as used to connect to the first data source, the same mapping re-configured to source from the local table instead of the business intelligence server; and
further comprising configuring the same mapping to source from the local table instead of the business intelligence server.

9. The method of claim 1, wherein identifying that the second subset of the data is to be loaded from the second data source is based at least in part on a parameter in a data integrator that enables users to switch data sources.

10. The method of claim 1, wherein identifying that the data is to be loaded from the second data source further comprises using a Data Integration Agent to transfer the data into a dynamically created temporary target table, and wherein a respective target table corresponds to a respective loading knowledge module (LKM) of a physical design.

11. The computer-readable medium of claim 2, wherein the operations further comprise:
receiving at least the second subset of the data from the first data source;
storing at least the second subset of the data as a text file in the second data source; and
converting data types of the data to the particular data type based at least in part on a mapping.

12. The computer-readable medium of claim 2, wherein selecting the second transport mechanism from among the plurality of selectable transport mechanisms based at least in part on the identification and the particular data type of the one or more data types comprises selecting a source-dependent data store (SDS) transport mechanism.

13. The computer-readable medium of claim 2, wherein at least one of the second data source or the data warehouse is managed by the computing system.

14. The computer-readable medium of claim 2, wherein the identification identifies that at least the second subset of the data is to be sourced from the second data source.

15. The system of claim 3, wherein at least the second subset of the data of the second data source comprises initial data from the first data source that was received from the first data source in an initial format.

16. The system of claim 3, wherein it is identified to source the data from the first data source when a connection with the first data source is direct.

17. The system of claim 3, wherein the second data source resides in the memory of the system.

18. The method of claim 4, further comprising storing at least the second subset of the data as a text file in the second data source.

19. The method of claim 8, wherein configuring the same mapping to source from the second data source instead of the business intelligence server further comprises converting business intelligence server data types into a temporary data type for storage in the local table and then into data base data types.

20. The method of claim 18, further comprising converting data types of at least the second subset of the data to the particular data type based at least in part on an identification that the second subset of the data is to be loaded from the second data source.

* * * * *